US011691809B2

(12) United States Patent
Cook (10) Patent No.: US 11,691,809 B2
(45) Date of Patent: Jul. 4, 2023

(54) DISCHARGE MEANS FOR DISPENSING APPARATUS

(71) Applicant: Severfield Products & Processing Ltd, Malton (GB)

(72) Inventor: Dennis Cook, Malton (GB)

(73) Assignee: Severfield Products & Processing Ltd

( * ) Notice: Subject to any disclaimer, the term of this patent is extended or adjusted under 35 U.S.C. 154(b) by 0 days.

(21) Appl. No.: 17/326,468

(22) Filed: May 21, 2021

(65) Prior Publication Data

US 2022/0340358 A1    Oct. 27, 2022

(30) Foreign Application Priority Data

Apr. 27, 2021   (GB) ...................................... 2106021

(51) Int. Cl.
| | |
|---|---|
| *B65D 88/68* | (2006.01) |
| *B65D 90/58* | (2006.01) |
| *B65D 88/28* | (2006.01) |

(52) U.S. Cl.
CPC ........... *B65D 90/587* (2013.01); *B65D 88/28* (2013.01)

(58) Field of Classification Search
CPC ........... B65G 65/4836; B65G 65/4818; B65G 11/02; B65G 11/026; B65G 11/126; B65G 11/206; B65D 90/587; B65D 90/626; B65D 88/28; B65D 88/68
USPC ................................ 222/410, 196, 342, 559
See application file for complete search history.

(56) References Cited

U.S. PATENT DOCUMENTS

| | | | | |
|---|---|---|---|---|
| 2,057,768 | A | * | 10/1936 | De Motte .............. C10H 15/06 222/242 |
| 2,574,231 | A | * | 11/1951 | Sinden .................... B65B 1/363 222/242 |
| 3,804,303 | A | * | 4/1974 | Fassauer ................ B65G 69/20 222/242 |

(Continued)

FOREIGN PATENT DOCUMENTS

| | | |
|---|---|---|
| EP | 854099 A1 | 7/1998 |
| GB | 2275762 A | 9/1994 |

(Continued)

*Primary Examiner* — Charles P. Cheyney
(74) *Attorney, Agent, or Firm* — Nyemaster Goode, P.C.

(57) ABSTRACT

A discharge assembly for use in or with dispensing apparatus. The discharge assembly includes an entry chamber for receiving one or more items to be dispensed in use. At least one discharge outlet is provided in the entry chamber. The directing member is movably mounted in the entry chamber for directing the one or more items through the at least one discharge outlet in use. At least one opening is defined in or associated with the directing member for allowing the one or more items to move through the at least one opening and towards the discharge outlet in use. A closure member is associated with the at least one opening of the directing member and said closure member is arranged to move in use between an open position, wherein the one or more items can move through the at least one opening of the directing member, and a closed position, wherein the one or more items are prevented from moving through the at least one opening of the directing member. A resilient biasing member is provided on or associated with the closure member to bias the closure member to the open position in use.

23 Claims, 8 Drawing Sheets

(56) References Cited

U.S. PATENT DOCUMENTS

| | | | | |
|---|---|---|---|---|
| 4,130,225 A | * | 12/1978 | Illes, Jr. | B65G 65/4836 |
| | | | | 222/502 |
| 4,361,254 A | * | 11/1982 | Teraoku | B65D 90/626 |
| | | | | 222/196 |
| 4,392,591 A | * | 7/1983 | Fassauer | B65D 88/68 |
| | | | | 366/296 |
| 4,506,811 A | * | 3/1985 | Miksitz | B65G 65/4836 |
| | | | | 222/411 |
| 5,385,437 A | * | 1/1995 | Lonardi | B65D 90/582 |
| | | | | 414/202 |
| 5,622,467 A | * | 4/1997 | Pethullis | B65G 65/4836 |
| | | | | 414/304 |
| 6,681,718 B1 | * | 1/2004 | McIlarky | A01K 5/0291 |
| | | | | 119/51.11 |
| 10,087,004 B2 | * | 10/2018 | Gill | B65G 11/02 |
| 2012/0048140 A1 | * | 3/2012 | Dial | B65G 67/50 |
| | | | | 105/377.05 |
| 2017/0297829 A1 | * | 10/2017 | Kiner | B65G 33/18 |

FOREIGN PATENT DOCUMENTS

| | | | |
|---|---|---|---|
| GB | 2291048 A | | 1/1996 |
| GB | 2275762 B | | 5/1997 |
| GB | 2377432 A | | 1/2003 |
| GB | 2377432 B | | 9/2004 |
| JP | 55119633 A | | 9/1980 |

\* cited by examiner

DISCHARGE MEANS FOR DISPENSING APPARATUS

BACKGROUND

This application is based upon and claims priority to United Kingdom (GB) patent application number 2106021.5 filed on Apr. 27, 2021, the complete disclosure of which is hereby expressly incorporated by this reference.

The present invention relates to discharge assembly for a dispensing apparatus and to a method of use thereof.

Although the following description refers almost exclusively to a discharge assembly for a dispensing apparatus in the form of a silo, it will be appreciated by persons skilled in the art that the dispensing apparatus could be any dispensing apparatus for dispensing any one or more items or material therefrom and is not just limited to a silo. For example, the dispensing apparatus could be a hopper, a storage reservoir and/or the like.

A conventional discharge assembly for a silo are disclosed in GB2377432. A silo is typically used to store freely flowable and pulverulent material, such as a powder or granular material. The discharge assembly for the silo comprises an entry chamber which is in communication with the silo interior. A directing member is rotatably mounted in the entry chamber for rotary motion about a vertical axis to direct flowable material in the entry chamber through a discharge passage in a bottom wall of the chamber. The directing member comprises an obstructing member having an upwardly extending wall with at least one opening therein. An arm or scoop is associated with the at least one opening and extends radially outwardly. On rotation of the directing member, the arm is adapted to engage flowable material in the entry chamber and direct the flowable material in a path towards the discharge passage in the bottom wall of the entry chamber through the at least one opening. The arm is pivotally connected to the obstructing member and is movable between an open position, wherein the flowable material is directed along the path, and a closed position, wherein the flowable material is not directed along the path and the arm closes the at least one opening.

In the above described design, the pivotally connected arms or scoops are moved between the open and closed position by forces imparted by the flowable material within the entry chamber due to the relative motion of the arms when the directing member rotates. However, a problem with this conventional design is that when pulverulent material of low density is to be dispensed from the silo, the forces imparted by the material can be insufficient to reliably initiate movement of the arms between the open and closed positions.

It is therefore an aim of the present invention to provide a discharge assembly that overcomes the abovementioned problem.

It is a further aim of the present invention to provide a method of using a discharge assembly that overcomes the abovementioned problem.

It is a yet further aim of the present invention to provide dispensing apparatus including discharge assembly that overcomes the abovementioned problem.

It is a yet further aim of the present invention to provide a method of using dispensing apparatus including discharge assembly that overcomes the abovementioned problem.

SUMMARY

According to a first aspect of the present invention there is provided a discharge assembly for use in or with a dispensing apparatus, said discharge assembly including:

an entry chamber for receiving one or more items to be dispensed in use;

at least one discharge outlet provided in the entry chamber;

a directing member movably mounted in the entry chamber for directing the one or more items through the at least one discharge outlet in use;

at least one opening defined in or associated with the directing member for allowing the one or more items to move through the at least one opening and towards the discharge outlet in use;

a closure member is associated with the at least one opening of the directing member and said closure member is arranged to move in use between an open position, wherein the one or more items can move through the at least one opening of the directing member, and a closed position, wherein the one or more items are prevented from moving through the at least one opening of the directing member; and wherein a resilient biasing member is provided on or associated with the closure member to bias the closure member to the open position in use.

The resilient biasing member of the present invention help to ensure there is sufficient force applied to the closure member to reliably move the closure member from the closed position to the open position in use, at least in the initial stages of opening, and particularly, although not necessarily exclusively, when the one or more items being dispensed in use may create insufficient force to reliably move the closure member directly from the closed position to the open position.

Preferably the resilient biasing member is any biasing member able to impart sufficient biasing force on the closure member to help move the closure member to an open position in use but still allowing the closure member to be moved to a closed position when required.

Preferably the biasing force imparted by the resilient biasing member on the closure member is such so as to generate a moment applied to the closure member proportional to approximately 3-5% of the torque or force generated or required for rotating or moving the directing member in use respectively.

Preferably the biasing force imparted by the resilient biasing member is sufficient to allow the closure member to be movable to an open position when the directing member is moved in a first direction but allow the closure member to be movable to a closed position when the directing member is moved in a second direction.

Preferably the second direction is typically the reverse or opposite of the first direction. For example, the first direction can be rotatable movement of the directing member in a clockwise direction and the second direction can be rotatable movement of the directing member in an anti-clockwise direction.

Preferably a force imparted by movement of one or more items against an outer surface of the closure member is sufficient to move the closure member from the open position to the closed position in use.

In one embodiment the resilient biasing member can include any or any combination of one or more members capable of providing a resilient biasing force; one or more springs, sprung members, hair pin springs, leaf springs, coiled springs and/or the like.

Preferably the resilient biasing member is made from sprung steel.

In one embodiment the resilient biasing member includes a curved portion, convexed portion, partial circle portion or partial loop portion. This typically provides the resilient biasing member with greater flexion to allow a greater force to be imparted by the resilient biasing member on the closure member over a greater distance compared to if the portion was not present.

In one embodiment the resilient biasing member is at least partially or wholly linear in form.

In one embodiment the resilient biasing member includes a curved portion, convexed portion, partial circle portion or partial loop portion, and a linear or substantially linear portion.

Preferably the curved portion, convexed portion, partial circle portion or partial loop portion is provided at or towards a first end of the resilient biasing member, and the linear or substantially linear portion is provided at or towards a second end of the resilient biasing member.

Preferably a first end of the resilient biasing member is further from a free end of the closure member and the second end of the resilient biasing member is closer to the free end of the closure member.

Preferably the closure member is pivotably mounted to the directing member via a pivot member at a first end of the closure member.

In one embodiment a first end of the resilient biasing member is provided at, adjacent to, towards or associated with a first end of the closure member or a bracket member to which the first end of the closure member is attached or mounted to the directing member.

Preferably a second end of the resilient biasing member is provided a spaced distance apart from the first end of the resilient biasing member, and further preferably the second end is provided at, adjacent to, towards or associated with a second or free end of the closure member.

Preferably at least part of the resilient biasing member, and further preferably the second end of the resilient biasing member, is arranged to engage with an inwardly facing surface of the closure member.

In one embodiment the second end of the resilient biasing member engages with the closure member at least when the closure member is in the closed position and for at least an initial stage of opening of the closure member.

In one embodiment, once the resilient biasing member has provided an initial biasing force to the closure member to start opening of the closure member (i.e. to start the closure member from moving from the closed position to the open position), the second end of the resilient biasing member disengages with the closure member and the force of the one or more items moving against the arm member in use continues to move the closure member to the fully open position. The second end of the resilient biasing member typically re-engages with the closure member as the closure member moves from the open position to the closed position.

In one embodiment the resilient biasing member is provided on or associated with a bracket member or member that is a spaced distance apart from the closure member. For example, the bracket member could be provided on or associated with an upstanding wall portion of the directing member.

In one embodiment the first end of the resilient biasing member is attached to the closure member or a bracket member of the closure member via attachment member.

Preferably the attachment member includes any or any combination of one or more members which allows attachment between the resilient biasing member and the closure member or bracket member, adhesive, welding, of one or more clamping members, clamping shells, apertures, recesses, inter-engaging members, screws, clips, nut and bolts and/or the like.

In one embodiment the resilient biasing member can be retrofitted to a closure member of existing discharge assembly or discharge apparatus, such as the arm members of the apparatus disclosed in GB2377432.

Preferably the second end of the resilient biasing member engages with a part of the closure member a spaced distance apart from a pivot axis or pivot member via which the closure member is attached to the directing member, and said distance is sufficient to create a turning movement of the closure member in use, at least in the initial stages of opening of the closure member.

In one embodiment a first end of the resilient biasing member is joined to or associated with a first inner end or surface of the closure member. Preferably a second end of the resilient biasing member is joined to or associated with a second inner end or surface of the closure member.

Preferably the closure member is attached to the directing member, and further preferably an upstanding wall member of the directing member via bracket member and the first end of the resilient biasing member is joined to or associated with the bracket member.

Preferably the one or more items being dispensed is or includes any or any combination of flowable material, such as for example a powder, granular material, particulate material, grain, cement, chemicals, animal feed, sand, soil, calcium carbonate, chalk; silicate material such as for example hydrated aluminium silicate, amorphous fumed silica, sodium alumino silicate; resins and/or the like.

Preferably the one or more items being dispensed includes flowable material having a density equal to or less than 300 $Kg/m^3$.

Preferably the entry chamber is adapted to be in communication with, associated with or mountable in discharge apparatus, and further preferably in communication with, associated with or mountable in an interior of the discharge apparatus.

Preferably the dispensing apparatus is or includes a silo, hopper, storage reservoir and/or the like.

Preferably the directing member is rotatably mounted in the entry chamber.

In one embodiment the directing member is in the form of a directing chamber. The directing chamber is mounted in the entry chamber such that the directing chamber forms a sub-chamber or sub-compartment within the entry chamber. One or more items in the entry chamber move from the exterior of the directing chamber to the interior of the directing chamber via the one or more openings.

Preferably the at least one discharge outlet is located within the directing member or chamber, which in turn is within the entry chamber.

Preferably the directing member is arranged to be rotatably mounted about a vertical axis in use. As such, the directing member typically rotates in a horizontal or substantially horizontal plane in use.

In one embodiment a drive member or mechanism is provided on or associated with the directing member for driving movement or rotation of the directing member in use.

Preferably the drive member or mechanism is or includes any or any combination of a motor, electric motor, gearing, gearbox and/or the like.

Preferably the drive member or mechanism includes a drive shaft that is joined to associated with the directing member for driving movement or rotation of the directing member in use.

Preferably the drive member or mechanism is arranged to move or rotate the directing member in a first direction or clockwise direction and a second direction or anti-clockwise direction in use (i.e. when operational). Movement of the drive member or mechanism and directing member in the first or clockwise direction typically moves the closure member to the open position. Movement of the drive member and directing member in the second or anti-clockwise direction typically moves the closure member to the closed position.

Preferably when the directing member is not moving (i.e. when non-operational), the closure member remains in the last position it was used in when last operational.

Preferably the directing member is arranged such that one or more items can move from the exterior of the directing member to the interior of the directing member via the at least one opening when the directing member is moved, and further preferably moved in the first direction, in use.

Preferably the at least one discharge outlet is in the form of any or any combination of an aperture, a passage, a channel, a sleeve, a valve, an actuatable vale, a dome valve, a butterfly valve and/or the like.

Preferably the at least one discharge outlet is located or defined in a bottom wall of the entry chamber.

Typically the at least one discharge outlet is located directly below the directing member (and preferably within the boundary of the directing member) in the entry chamber so that the one or more items entering the directing member via the opening can then move into or towards the at least one discharge outlet in use.

Preferably the directing member is any member or device capable of directing the one or more items in the entry chamber towards and through the discharge outlet in use.

In one embodiment the directing member includes a directing chamber or an obstructing member.

Preferably the directing chamber or obstructing member has or includes an upwardly extending wall or walls.

Further preferably the directing chamber or obstructing member has a cone portion on top of the upwardly extending wall or walls (i.e. on an end of the upwardly extending wall opposite to the end of the wall adjacent a base of the entry chamber). In this arrangement, the obstructing member is typically frusto-conical in shape.

Further preferably the at least one opening is defined in the upwardly extending wall or walls.

Preferably the closure member is any device or member able to move between the open and closed positions with respect to the at least one opening in use.

In one embodiment the closure member includes or consists of at least one arm member, a scoop member and/or the like.

Preferably the closure member has at least an outer surface and an inner surface.

Preferably the closure member has an end or part which protrudes outwardly of the at least one opening of the directing member when in the closed position.

Preferably the closure member has a first end pivotally attached, directly or indirectly, to the directing member or upwardly extending wall of the directing member.

Preferably a second end of the closure member is arranged to project or protrude further outwardly of the axis of rotation of the directing member than the first end of the closure member, and further preferably radially further outwardly of the axis of rotation of the directing member.

Preferably the closure member is arranged to engage the one or more items in the entry chamber and direct the items in a path that has a radially inward component towards the discharge outlet through the at least one opening of the directing member.

Preferably the closure member is provided on, connected to or associated with the upwardly extending wall of the directing member.

Further preferably the closure member is pivotally or hingedly connected, directly or indirectly, to the directing member or obstructing member via pivot member or hinge member.

Preferably the closure member pivots about the pivot member or hinge member in moving between the open and closed positions in use.

Preferably, with the closure member in the open position, the one or more items are movable along the path having the radially inward component or can be moved through the at least one opening.

Preferably, with the closure member in the closed position, the one or more items are not movable along the path having the radially inward component or cannot be moved through the at least one opening.

In one embodiment the closure member includes a lip portion having a surface which extends outwardly of the upwardly extending wall.

Preferably the lip portion is provided at the second end of the closure member.

Preferably the lip portion is adapted to engage one or more items in the entry chamber on rotation of the directing member in a first direction, thereby causing the closure member to move outwardly of the directing member, and preferably pivotably move, from the closed position to the open position.

Preferably the outer surface of the closure member, when the closure member is in an open position, faces in a reverse direction to the first direction of movement of the directing member. The closure member is adapted such that on rotation of the directing member in the reverse direction, it engages with the one or more items in the entry chamber to move the closure member, and preferably pivotably move, from the open position to the closed position.

Preferably, on movement of the directing member in the reverse direction, the outer surface of the closure member faces the direction of movement of the directing member.

In one embodiment two closure members are provided and each closure member has an associated opening defined in the directing member.

Preferably the two or more closure members are provided in diametrically opposed position on the directing member or upwardly extending wall thereof.

In one embodiment the directing member is provided with one or more carrier vanes, whereby the one or more items which have passed through the openings into the interior of the directing member can be transferred to the at least one discharge outlet by the carrier vanes. Thus, the carrier vanes help to push or carry the one or more items from the interior of the directing member to the at least one dispensing outlet.

Preferably each carrier vane includes a blade protruding radially inwardly from the upstanding wall of the directing member/obstructing member.

Preferably at least one set of a plurality blades are provided, the blades of each set being of progressively greater radial length in the first direction of rotation of the directing member.

Preferably the blades are located a spaced distance apart on an interior wall or the upstanding wall of the directing member.

In one embodiment each set of blades comprises two or three blades provided between the pivotal axis of the arm member and the next opening.

Preferably each blade increases in length by equal or substantially equal increments.

Preferably the blades or carrier vanes are made from sprung steel, whereby the blades or vanes can deflect from and return to their original position to prevent over-compaction of the one or more items or product degradation of the one or more items in the event the discharge outlet is blocked or obstructed.

In one example the entry chamber of the dispensing member includes a frusto-conical portion or a portion having a narrowing taper towards a lower end thereof, and a plate portion provided at the lower end of the portion or frusto-conical portion.

Preferably there are two or more discharge outlets provided in the entry chamber.

Further preferably there are four discharge outlets provided in the entry chamber.

Preferably the two or more discharge outlets are provided a spaced distance apart, and further preferably equi-distant apart in the entry chamber.

Preferably the at least one dispensing outlet is provided in a base wall of the entry chamber.

In one embodiment the directing member is provided centrally or substantially centrally of the entry chamber and above the base wall of the entry chamber.

In one embodiment the discharge assembly is any mechanism that allows discharge of one or more items from dispensing apparatus in use.

According to a second aspect of the present invention there is provided a method of using discharge assembly, said discharge assembly including:
- an entry chamber for receiving one or more items to be dispensed in use;
- at least one discharge outlet provided in the entry chamber;
- directing member movably mounted in the entry chamber;
- at least one opening defined in or associated with the directing member;
- closure member is associated with the at least one opening of the directing member;
- said method including the steps of
- moving the directing member to move and direct the one or more items from an exterior of the entry chamber to an interior of the directing member through the at least one opening and towards the discharge outlet in use;
- moving the closure member between an open position, wherein the one or more items can move through the at least one opening of the directing member, and a closed position, wherein the one or more items are prevented from moving through the at least one opening of the directing member; and wherein resilient biasing member is provided on or associated with the closure member to bias the closure member to the open position in use.

According to a further aspect of the present invention there is provided dispensing apparatus including discharge assembly.

Preferably the dispensing apparatus is or includes a silo, hopper, storage reservoir and/or the like.

In one embodiment the dispensing apparatus includes a storage reservoir supported on support member.

Preferably the support member includes a frame, one or more support legs and/or the like.

According to a yet further aspect of the present invention there is provided a method of using dispensing apparatus including discharge assembly.

BRIEF DESCRIPTION OF THE DRAWINGS

Embodiments of the present invention will now be described with reference to the following figures, wherein.

DETAILED DESCRIPTION

Figure 1:
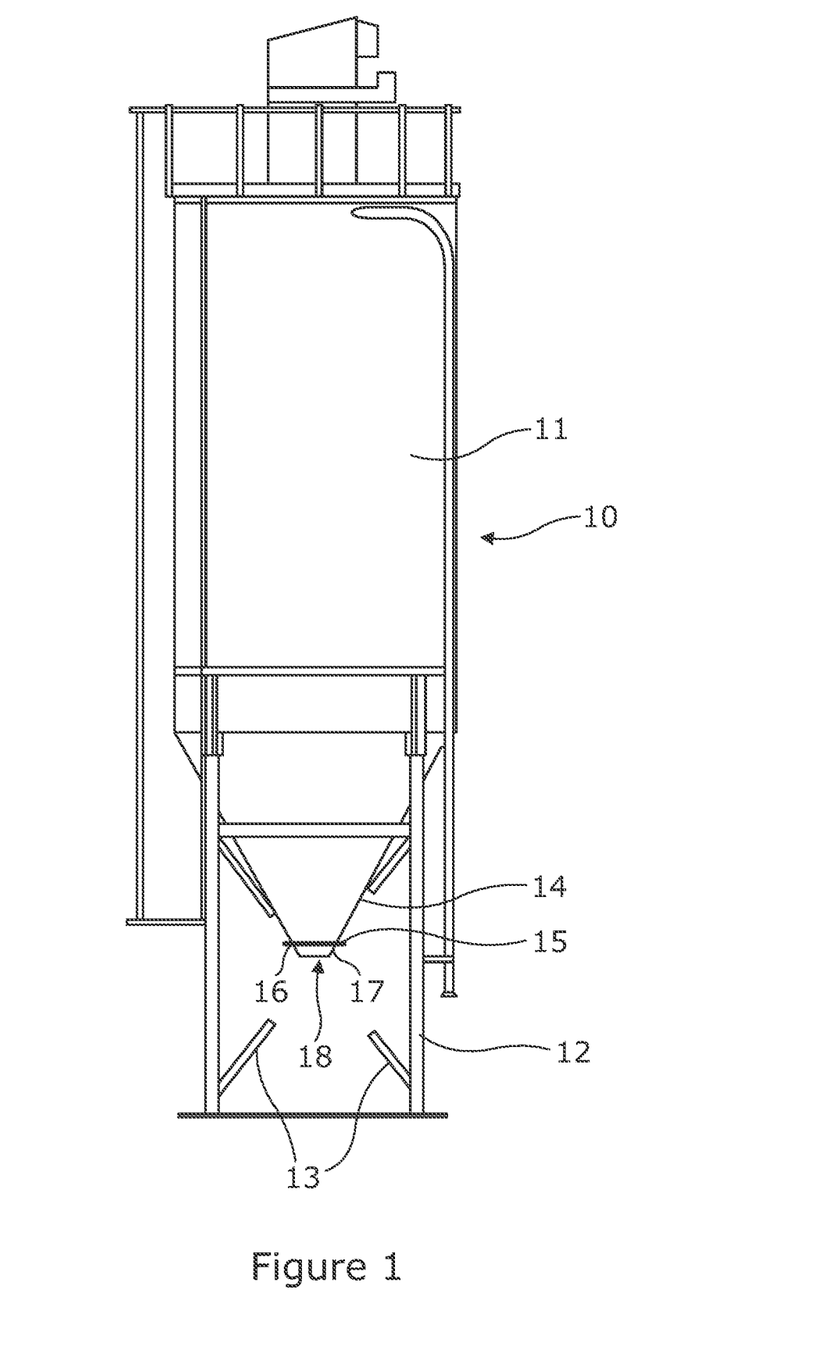
FIG. 1 is an example of dispensing apparatus in the form of a silo in which the dispensing member according to the present invention can be provided.

Referring to FIG. 1, there is illustrated discharge apparatus in the form of a silo 10 for containing one or more items, such as for example, grain, sand, powder, granular material, particulate material, flowable material, cement, sludge fibrous materials and/or the like. The silo 10 contains a main storage reservoir 11 which can be of any size, shape and/or design. In the illustrated example, the storage reservoir 11 is generally cylindrical in shape and is supported on support member in the form of legs 12. The legs 12 have cross braces for strength and rigidity of the support structure. A discharge portion 14 is provided at the lower end of the main storage reservoir 11 for allowing discharge of the one or more items from the storage reservoir when required. The discharge portion 14 is frusto-conical in shape in the illustration but could be any suitable as required.

An extending annular flange 15 is provided at the lower end of the discharge portion 14 and is connected to an end part 16 of discharge assembly 17. The discharge assembly 17 is for discharging the one or more items from the discharge apparatus in use.

The discharge portion 14 includes a plate 19, the outer portion of which provides the end part 16. The discharge portion 14 and the plate 19 define an entry chamber 20 of the discharge assembly 17. The entry chamber is in communication with the main interior 11 of the silo 10 and of which plate 19 provides a bottom wall.

Figure 2:
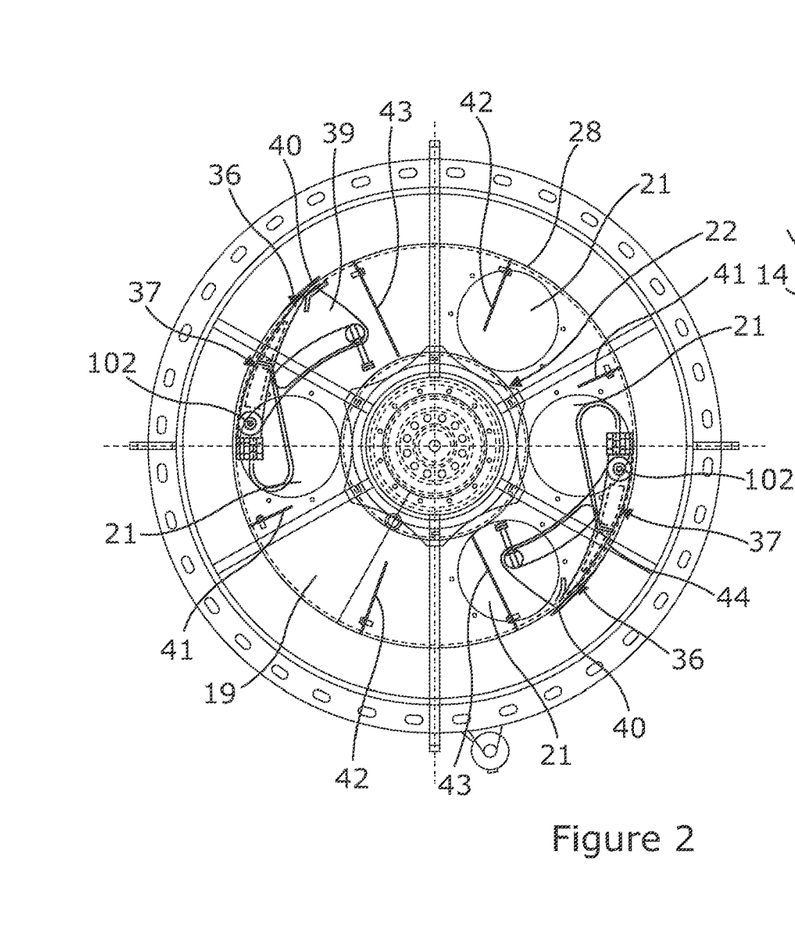
FIG. 2 is a plan view of the discharge assembly according to an embodiment of the present invention.
Figure 3:
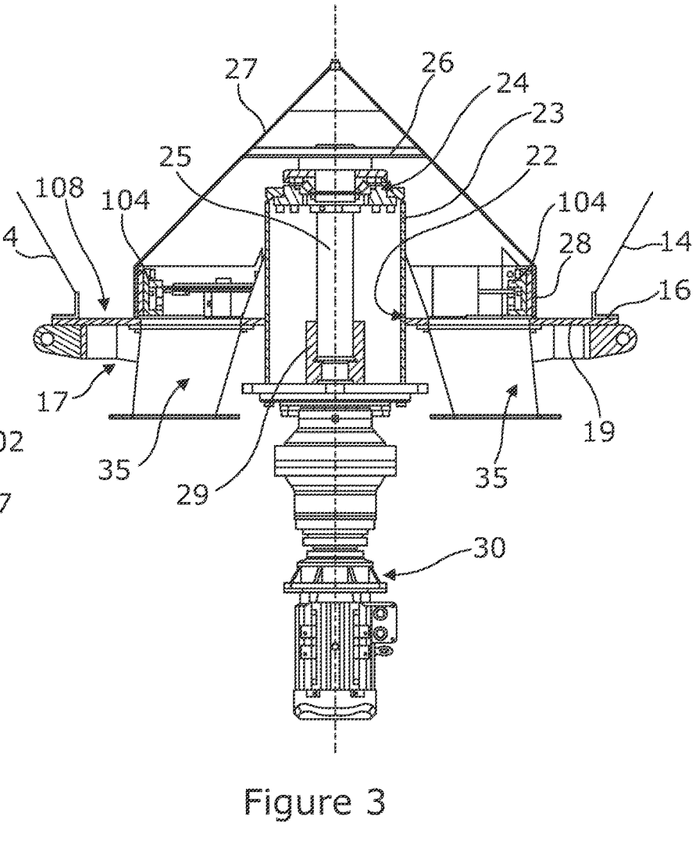
FIG. 3 is a section take along the line X-X of the discharge assembly in FIG. 2.

The plate 19 of the entry chamber 20 has discharge outlets including four outer apertures 21 defined therein which are of generally circular configuration and are positioned outwardly of a central aperture 22. The discharge outlets allow the one or more items to be discharged from silo 10 in use.

Directing member is movably mounted in the entry chamber 20 for directing the one or more items from the entry chamber to the discharge outlet apertures 21 in use. Drive assembly is also provided in the entry chamber 20 for driving movement, and particularly rotation, of the directing member in use.

The drive assembly includes a sleeve member 23 disposed within the central aperture 22 which carries a bearing arrangement 24 at its upper end by which a central drive shaft 25 is rotatably mounted. The central shaft 25 is bolted to an intermediate plate 26 of a directing chamber or an obstructing member 27 forming part of the directing member.

The directing chamber or obstructing member 27 is of generally frusto-conical shape and has a generally cylindrical wall 28 at its lower end. The cylindrical wall 28 projects upwardly relative to the plate 19. The obstructing member 27 is rotatable relative to plate 19 in use via the drive assembly.

The shaft 25 is connected, at its lower end, to an output shaft 29 of an electric motor/gearbox assembly 30 forming part of the drive assembly.

The discharge outlet includes a passage 35 fastened to the underside surface of the plate 19 beneath each of the outer apertures 21. Each discharge passage 35 extends generally downwardly and outwardly from the plate 19 beneath the associated aperture 21. The outer apertures 21 and discharge passages 35 are provided directly below the obstructing member and within the outer perimeter of the upwardly extending wall 28. Although four outer apertures 21 are shown as being defined in plate 19 of the entry chamber. It will be appreciated that more or less outer apertures could be provided as required.

In use, one or more items located in the entry chamber are moved from the exterior of the directing member to the interior of the directing member via openings 36 defined in the directing member. More specifically, a pair of openings 36 are defined in the upstanding wall 28 of the directing member at opposite locations. Each opening 36 has closure member in the form of an arm member 37 associated with the same. Each arm member 37 is pivotably mounted to a bracket 104 attached to an inner surface of the upstanding wall 28 at a first inner end 100 of arm member 37 via a pivot pin or shaft 102. The longitudinal axis of the shaft 102 is parallel to the upstanding wall 28. The arm member 37 is pivotably movable about the shaft 102 between open and closed positions in use.

In the open position, the one or more items can move from the exterior of the directing member through the openings 36 and into the interior of the directing member. In the closed position, the one or more items located in the entry chamber and externally of the directing member is prevented from moving through the openings 36 and into the interior of the directing member.

Each arm member 37 has an outwardly facing surface 44 of similar curvature to the upstanding wall 28. Each arm member 37 includes an upper wall 39 and a lip part 40 provided at a second outer end 106 of arm member 37.

In accordance with the present invention, a resilient biasing member is associated with each arm member 37 to resiliently bias the arm member to the open position in use. This is particularly useful if the items being dispensed are of insufficient density to impart sufficient force on the arm member to reliably move it from the closed position to the open position in use. The resilient biasing member is specifically designed to impart sufficient force to the arm member to assist with opening the same when the discharge assembly is being operated in a first or clockwise direction but still allow generation of sufficient force to close the arm member when the discharge assembly is operated in a second reverse anti-clockwise direction. The resilient biasing member is also chosen to minimise any disruption to the flow of material or the generation of additional operating forces while dispensing the items or material.

Figure 4A:
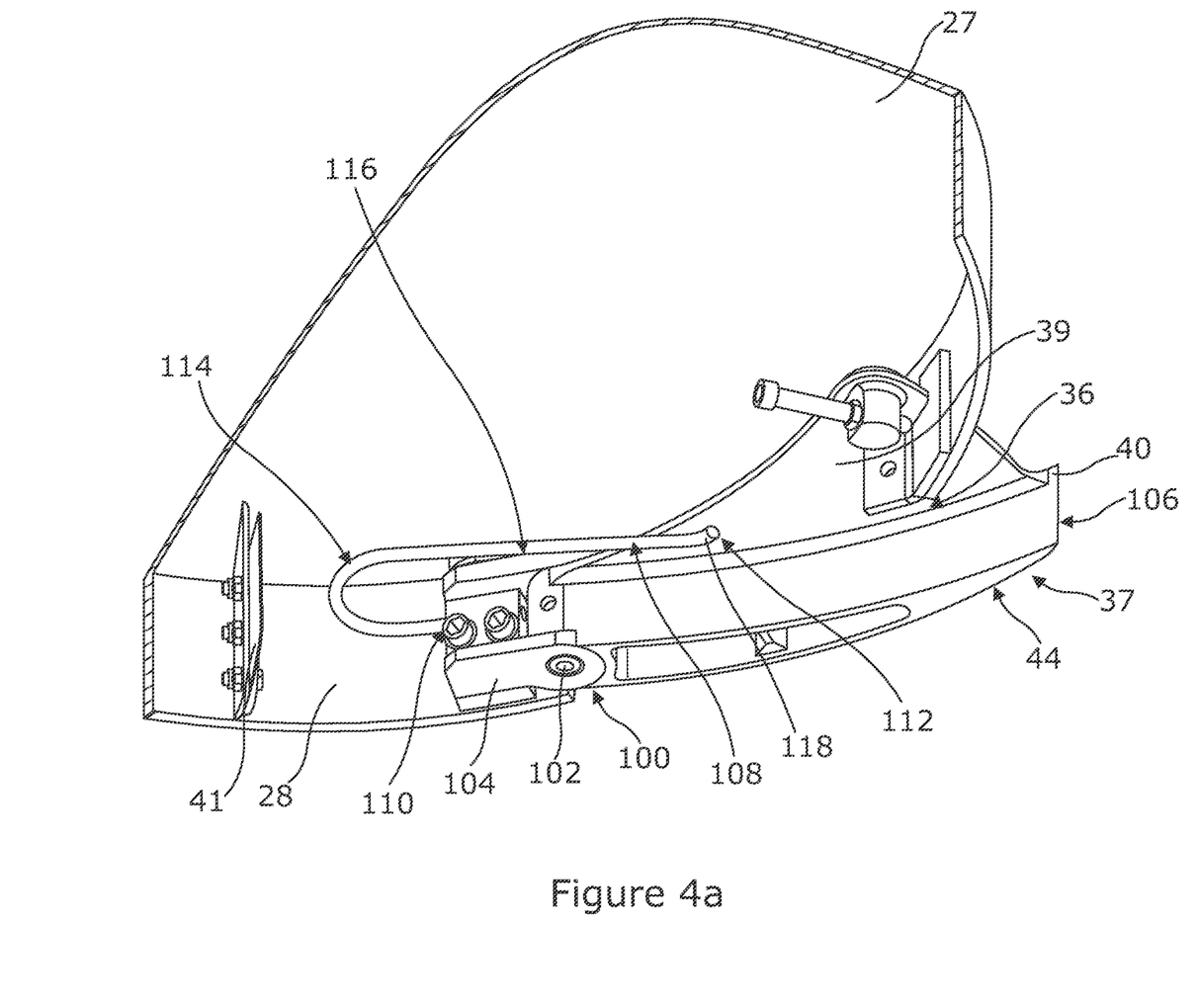
FIGS. 4a and 4b show detailed perspective views of an arm member provided in the discharge assembly according to one embodiment of the present invention in an open position and a closed position respectively.
Figure 4B:
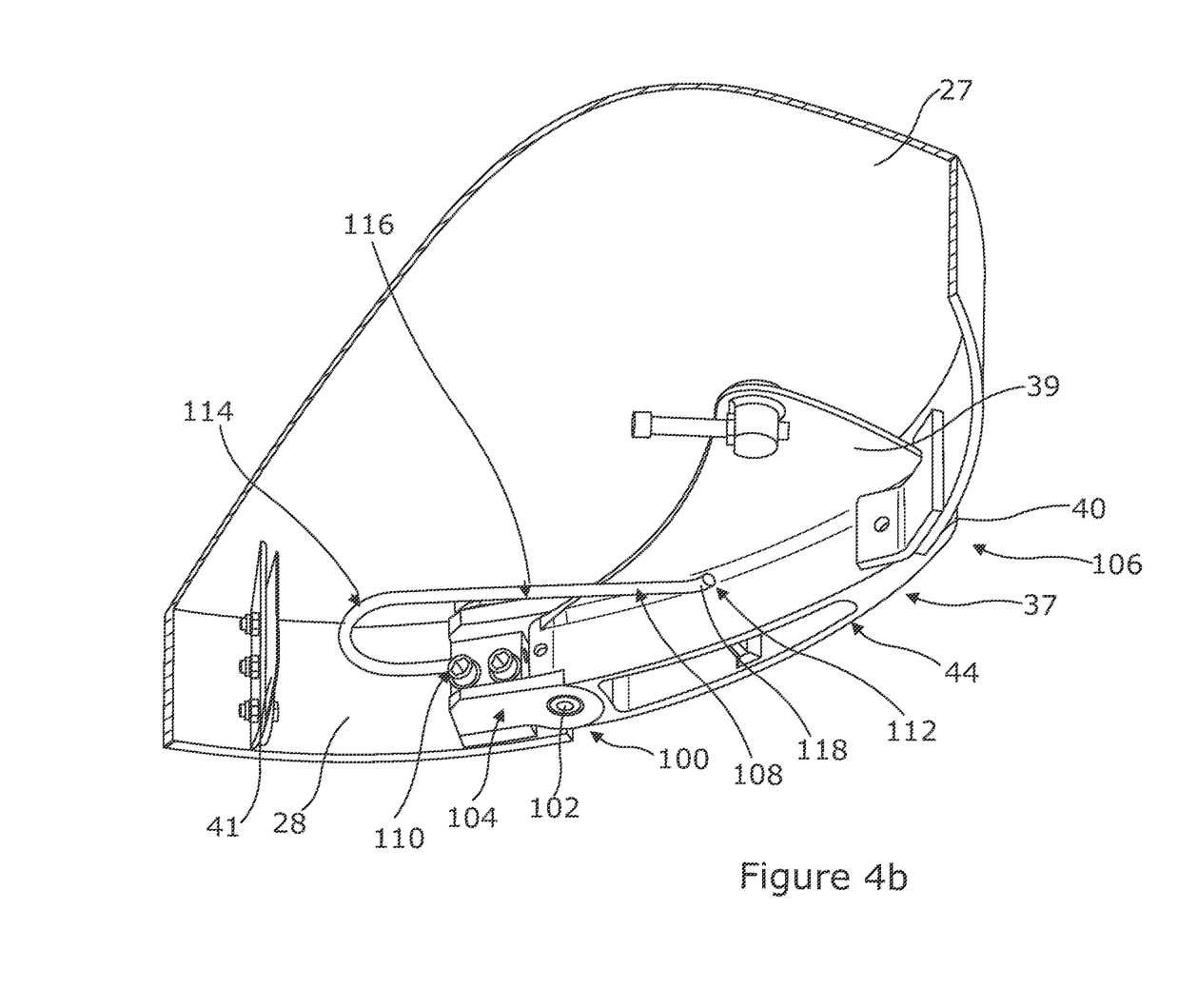

In FIGS. 4a-4b, the resilient biasing member is in the form of a sprung member 108 having a generally circular cross-sectional shape. Such a spring may often be referred to as a hair pin spring. A first end 110 of the sprung member 108 is fixedly connected to bracket 104. The second end 112 of the sprung member 108 engages with an inner surface of arm member 37 when the arm member 37 is in the closed position and during at least the initial opening stages of the arm member 37 as it moves from the closed position to the open position.

Although the second end 112 of the sprung member 108 can remain in contact with the arm member 37 during the entire process of opening and closing of the arm member with respect to the opening 36, it has been found that as long as the second end of the sprung member 108 remains in contact with the arm member 37 for at least the initial opening stages of the arm member when moving from the closed position to the open position, this allows the resilient biasing member to generate sufficient biasing force on the arm member to then allow movement of the one or more items against the inner surface of the arm member to continue moving the arm member to the fully open position. Thus, when the arm member 37 is in the fully open position, the second end 112 of the sprung member 108 is a spaced distance apart from the arm member 37, as shown in FIG. 4a.

In one example, the bracket 104 includes two clamping members with a channel defined between the same. The first end 110 of the sprung member 108 is located in the channel between the clamping members. When attachment member is in the form of threaded fasteners are tightened to draw the clamping members together, this firmly clamps the first end 110 of the sprung member 108 between the clamping members to secure the sprung member in position.

Sprung member 108 has a generally curved or convex portion 114, a generally linear portion 116 and an engaging portion 118 at the second end 112. This shape of the sprung member 108 is such so as to provide it with sufficient flexion to impart the necessary biasing force along the length of arm member 37 in order to open the arm member.

The sprung member 108 can be retrofitted to an existing arm member 37 of a conventional dispensing system, such as the one shown in GB2377432.

Figure 5A:
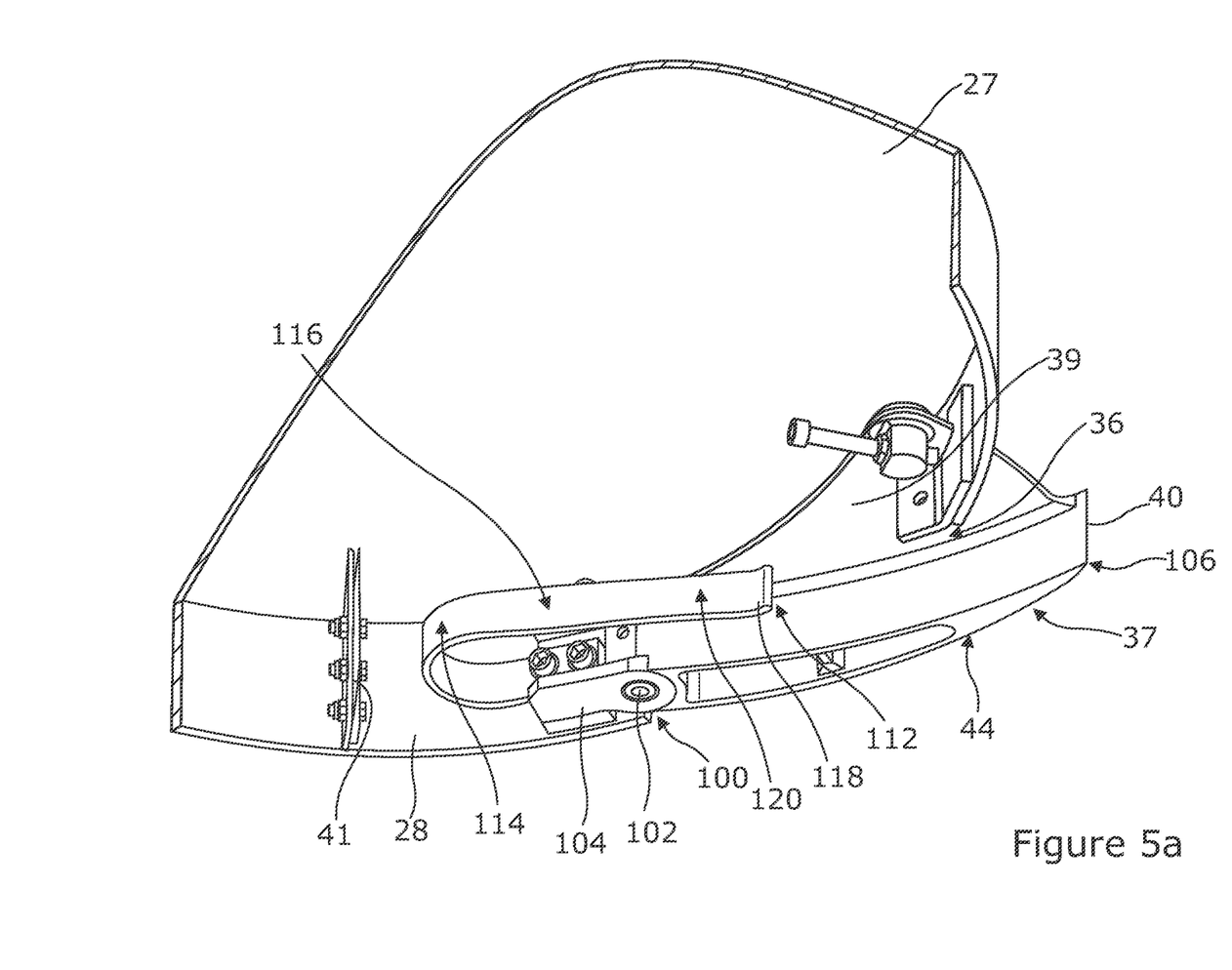
FIGS. 5a and 5b show detailed perspective views of an arm member provided in the discharge assembly according to a further embodiment of the present invention in an open position and a closed position respectively.
Figure 5B:
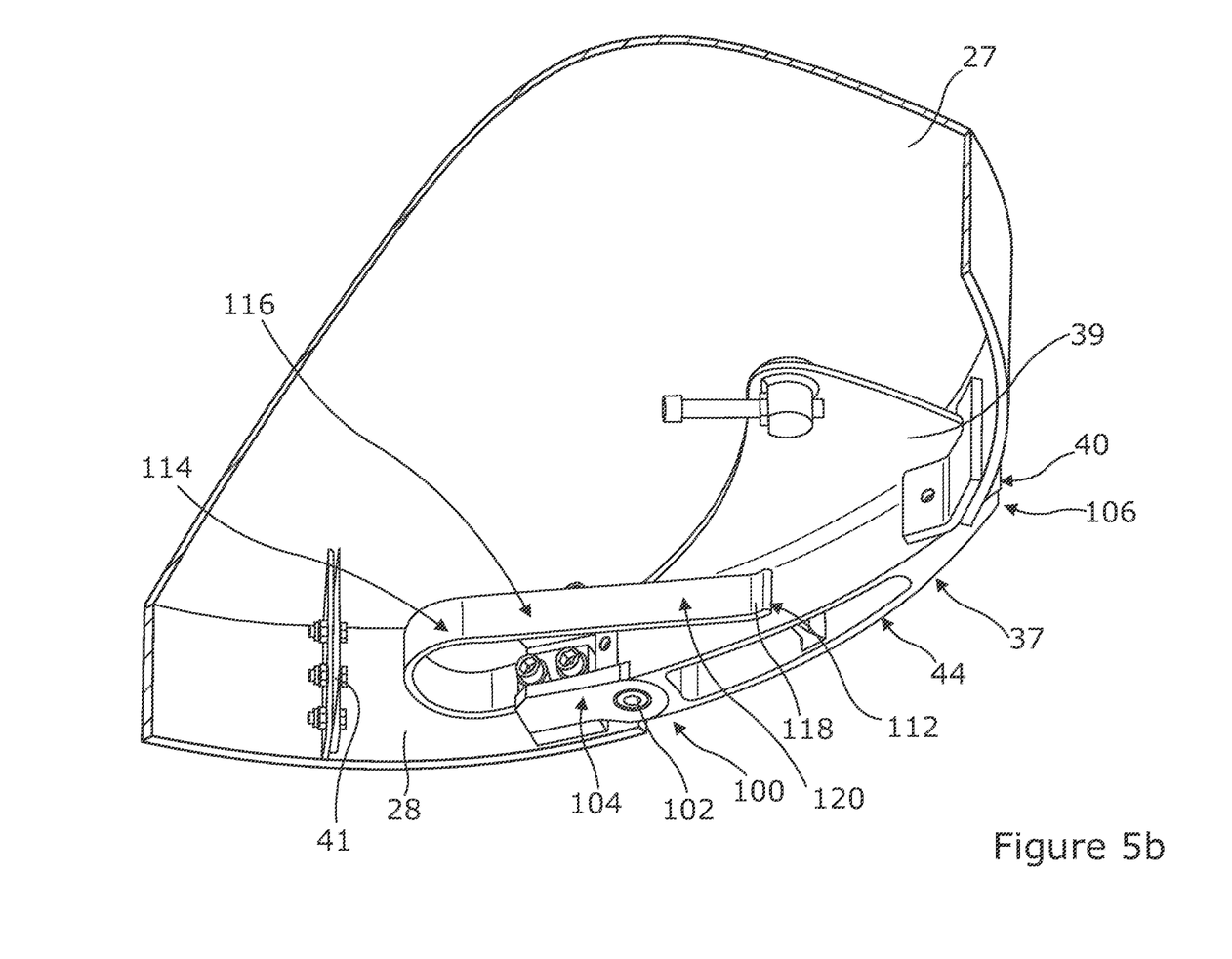

In FIGS. 5a-5b, the resilient biasing member is in the form of a sprung member 120 having a rectangular cross-sectional shape. It operates in a similar manner to the sprung member 108 shown in FIGS. 4a-4b in use.

Figures 6A, 6B:
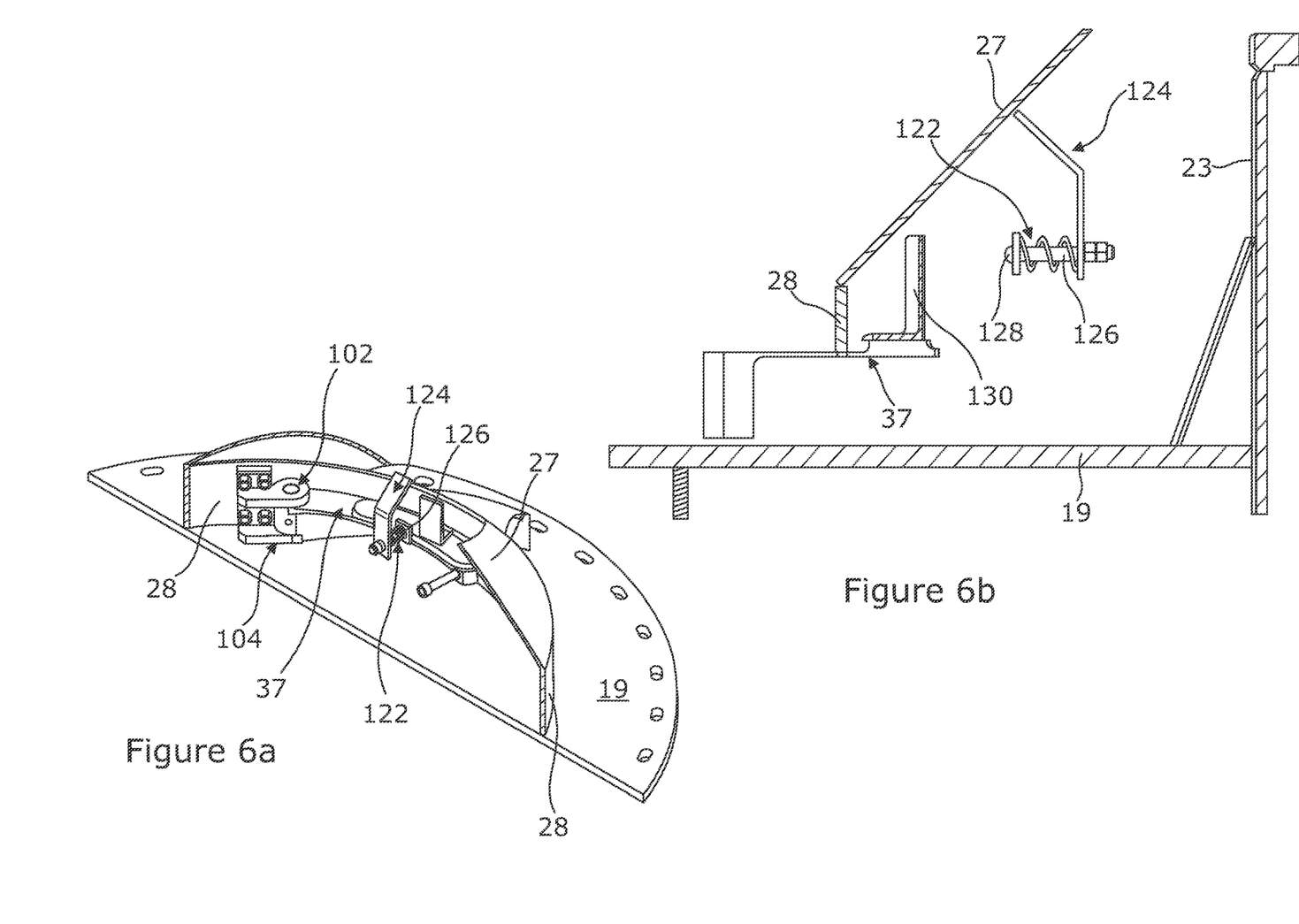
FIGS. 6a and 6b show a detailed perspective view and a cross sectional view of an arm member provided in the discharge assembly according to a yet further embodiment of the present invention in an open position.

In FIGS. 6a-6b, the resilient biasing member includes a coiled spring 122. In this embodiment, the coiled spring 122 is provided on a bracket 124 that is separate to the bracket 104 joining the arm member 37 to the upwardly extending wall 28. The bracket 124 is fixed to the interior surface of the obstructing member 27. A support member 126 is attached to bracket 124 and the coiled spring 122 is provided on the support member between the bracket 124 and an engaging portion 128. The engaging portion 128 contacts an engaging plate 130 provided on top of arm member 37.

Figure 6C:
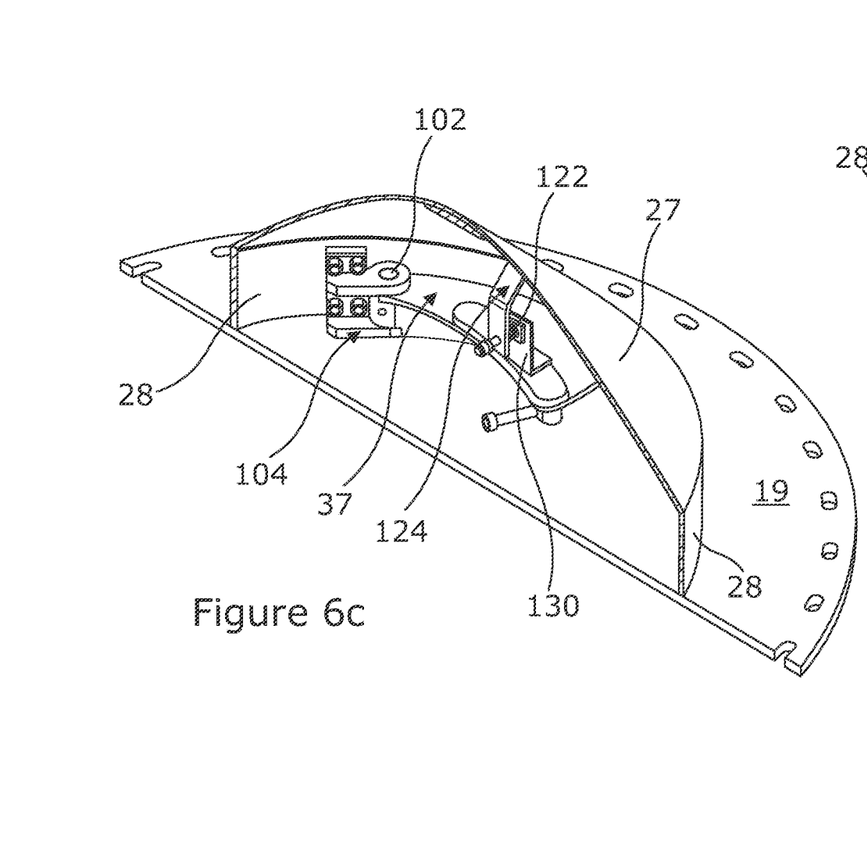
FIGS. 6c and 6d show a detailed perspective view and a cross sectional view of an arm member provided in the discharge assembly according to a yet further embodiment of the present invention in a closed position.
Figure 6D:
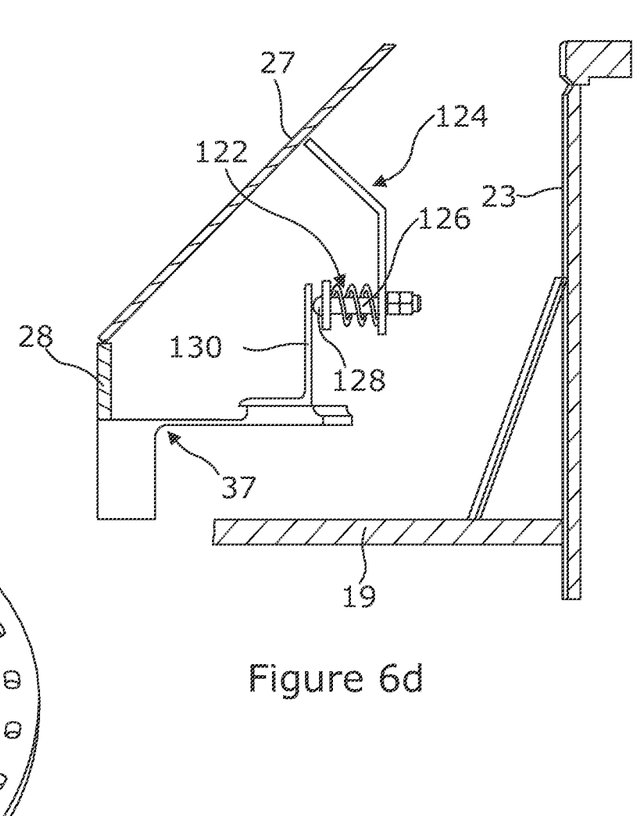

With the arm member 37 in the closed position, the engaging portion 128 of the resilient biasing member engages with the engaging plate 130 of the arm member 37.

As the obstructing member rotates in a first clockwise direction in use, the biasing force created by the spring 122 acting on engaging plate 130 helps to move the arm member 37 from the closed position to the open position, at least in the initial stages of opening of the arm member 37.

It will be appreciated by persons skilled in the art that the design of the resilient biasing member can be optimised depending on the application of use, such as for example depending on the density and/or fluidity of the material being dispensed, the size and/or operating capacity of the discharge member and/or the like.

Secured to the inner surface of the upstanding wall 28 are two sets of three carrier vanes 41, 42, 43. Each set is provided between the axis of pivot (shaft 102) of arm member 37 and the next following opening 36. The carrier vane 41 is approximately one third of the length of carrier vane 43. The carrier vane 42 is approximately two thirds the length of carrier vane 43. The carrier vanes 41 are diametrically opposite each other, as are carrier vanes 42 and 43.

The carrier vanes are made of sprung steel in one example in order to prevent over-compaction of product degradation in the event that the discharge passage 35 becomes obstructed or blocked.

In use, when it is required to discharge material from main body 11 of the silo 10, the motor/gearbox assembly 30 is operated to rotate the shaft 25 and hence rotate obstructing member 27 and upstanding wall 28 in a first direction or clockwise manner. The lips 40 of the arm members 37 are forced against the items or material contained in the entry chamber 20 and this helps to cause arm members 37 to be moved from a closed position, as shown in FIG. 4b, to an open position, as shown in FIG. 4a. The biasing force provided by the resilient biasing member acting on the arm member further helps to move the arm member from the closed position to the open position, as previously described. As a result, the items or material is caused to flow from an annular space 108 in the entry chamber 20 defined between the external surface of the upstanding wall 28 and the frusto-conical discharge portion 14, along arm member 37 and through the associated opening 36. Once the items or material enter the interior of the obstructing member 27, the items or material are carried by the carrier vanes 41, 42, 43 to the discharge apertures 21 and then into the discharge passage 35. As the carrier vanes 41, 42, 43 are graduated in length, pulsation of the material/item flow is minimised because approximately one third of the item/material delivered into the entry chamber is carried by the first carrier vane 41, two thirds is carried by the second carrier vane 42 and the remainder by the full length carrier vane 43.

When it is desired to stop the flow of material/items, the direction of rotation of the motor/gearbox assembly 30 is reversed. As such, the direction of rotation of the shaft 25 and the obstructing member 27 is reversed so that it rotates in an anticlockwise direction. This causes arm members 37 to rotate about shaft 102 to cause the arm members 37 to close the openings 36, as shown in FIG. 4b. As the arm member 37 approaches the closed position, the resilient biasing member re-engages with the inner surface of the arm member. The force applied to the outer surface 44 of the arm members 37 by the flowable material in the space 108 of the discharge portion 14 is greater than the biasing force provided by the resilient biasing member and prevents any further material/items from flowing through the openings 36.

The invention claimed is:

1. A discharge assembly for use in or with dispensing apparatus, said discharge assembly including:
   an entry chamber for receiving material to be dispensed;
   at least one discharge outlet provided in the entry chamber;
   a directing member rotably mounted in the entry chamber for directing the material through the at least one discharge outlet;
   at least one opening defined in or associated with the directing member for allowing the material to move from an exterior of the directing member through the at least one opening to an interior of the directing member and towards the discharge outlet when the directing member is moving;
   a closure member associated with the at least one opening of the directing member, said closure member pivotably mounted, directly or indirectly, to the directing member and being arranged to move between an open position, wherein the material can move through the at least one opening of the directing member, and a closed position, wherein the material is prevented from moving through the at least one opening of the directing member; and
   wherein a resilient biasing member is provided on or associated with the closure member to bias the closure member from the closed position to the open position, at least in an initial stage of opening of the closure member.

2. The discharge assembly according to claim 1, wherein the biasing force imparted by the resilient biasing member on the closure member is configured to generate a force sufficient to allow the closure member to move to the open position when the directing member is moved in a first direction but allow the closure member to move to the closed position when the directing member is moved in a second direction.

3. The discharge assembly according to claim 1, wherein the resilient biasing member includes any or any combination of one or more members capable of providing a resilient biasing force; one or more springs, sprung members, hair pin springs, leaf springs, sprung steel, or coiled springs.

4. The discharge assembly according to claim 1, wherein the resilient biasing member includes a curved portion, convex portion, partial circle portion, and linear or substantially linear portion.

5. The discharge assembly according to claim 4, wherein a first end of the resilient biasing member is provided with the curved portion, convex portion, partial circle portion or partial loop portion, and said first end is closest to pivot and/or bracket member via which the closure member is pivotably mounted and/or mounted to the directing member.

6. The discharge assembly according to claim 1, wherein an end of the resilient biasing member is arranged to engage with an inwardly facing surface of the closure member.

7. The discharge assembly according to claim 1, wherein an end of the resilient biasing member is arranged to engage with the closure member at least when the closure member is in the closed position and for an initial stage of opening of the closure member.

8. The discharge assembly according to claim 7, wherein once the resilient biasing member has provided an initial biasing force to the closure member to start opening of the closure member, said end of the resilient biasing member disengages with the closure member and the force of the material moving against the closure member continues to move the closure member to the fully open position.

9. The discharge assembly according to claim 1, wherein the directing member is arranged in the entry chamber such that the material is locatable in the entry chamber can be moved from the exterior of the directing member to the interior of the directing member via the at least one opening when the directing member is moved once in the interior of the directing member, the material can be moved into or towards the at least one discharge outlet.

10. The discharge assembly according to claim 1, wherein the directing member comprises a directing chamber having an upwardly extending wall or walls, the at least one opening defined in the upwardly extending wall or walls, and optionally a cone portion located on top of the upwardly extending wall or walls.

11. The discharge assembly according to claim 1, wherein the closure member is in the form of at least one arm member and/or scoop member.

12. The discharge assembly according to claim 1, wherein the closure member has a first end pivotably attached, directly or indirectly, to the directing member or an upwardly extending wall of the directing member, and a second end of the closure member is arranged to project or protrude further outwardly of an axis of rotation of the directing member than the first end of the closure member.

13. The discharge assembly according to claim 1, wherein the directing member is provided with one or more carrier vanes to help carry the material in the interior of the directing member towards the at least one dispensing outlet.

14. The discharge assembly according to claim 13, wherein the one or more carrier vanes includes a set of blades, the blades arranged a spaced distance apart on an interior wall or an upstanding wall of the directing member.

15. The discharge assembly according to claim 14, wherein the blades of each set are of progressively greater radial length in a first direction of rotation of the directing member.

16. The discharge assembly according to claim 13, wherein the carrier vanes are flexible or are made from sprung steel.

17. The discharge assembly according to claim 1, wherein the dispensing apparatus includes a silo, hopper, or storage reservoir.

18. A discharge assembly for use in or with dispensing apparatus, said discharge assembly including:
an entry chamber for receiving material to be dispensed;
at least one discharge outlet provided in the entry chamber;
a directing member movably mounted in the entry chamber for directing the material through the at least one discharge outlet;
at least one opening defined in or associated with the directing member for allowing the material to move through the at least one opening and towards the discharge outlet;
a closure member associated with the at least one opening of the directing member and said closure member arranged to move between an open position, wherein the material can move through the at least one opening of the directing member, and a closed position, wherein the material is prevented from moving through the at least one opening of the directing member;
wherein a resilient biasing member is provided on or associated with the closure member to bias the closure member to the open position, at least in an initial stage of opening of the closure member; and
a drive member provided on or associated with the directing member for driving movement or rotation of the directing member
wherein an end of the resilient biasing member is arranged to engage with the closure member at least when the closure member is in the closed position and for an initial stage of opening of the closure member,
wherein once the resilient biasing member has provided an initial biasing force to the closure member to start opening of the closure member, said end of the resilient biasing member disengages with the closure member and the force of the material moving against the closure member continues to move the closure member to the fully open position.

19. A method of using a discharge assembly, said discharge assembly including:
an entry chamber for receiving material to be dispensed;
at least one discharge outlet provided in the entry chamber;
a directing member rotatably mounted in the entry chamber;
at least one opening defined in or associated with the directing member;
a closure member associated with the at least one opening of the directing member, said closure member pivotably mounted, directly or indirectly, to the directing member;
said method including the steps of
moving the directing member to move and direct the material from an exterior of the directing member to an interior of the directing member through the at least one opening and towards the discharge outlet;
moving the closure member between an open position, wherein the can move through the at least one opening of the directing member, and a closed position, wherein the material is prevented from moving through the at least one opening of the directing member; and
wherein resilient biasing member is provided on or associated with the closure member to bias the closure member from the closed position to the open position, at least in an initial stage of opening of the closure member.

20. The discharge assembly of claim 1 further comprising a drive member provided on or associated with the directing member for driving movement or rotation of the directing member.

21. The discharge assembly of claim 20 wherein the drive member includes one or more of a motor, an electric motor, gearing, and a gearbox.

22. The discharge assembly of claim 20 wherein the drive member is manually operated.

23. The discharge assembly of claim 1 wherein the directing member is rotatable in a forward direction and a reverse direction, and the closure member is configured to move from the open position to the closed position upon rotation of the directing member in the reverse direction.

* * * * *